United States Patent [19]
Tannenbaum

[11] Patent Number: 5,369,601
[45] Date of Patent: Nov. 29, 1994

[54] METHOD AND APPARATUS FOR EQUESTRIAN MONITORING FOR INSTRUCTION AND TRAINING

[76] Inventor: Gail Tannenbaum, 2208 Allen St., Allentown, Pa. 18104

[21] Appl. No.: 2,906
[22] Filed: Jan. 11, 1993
[51] Int. Cl.$^5$ ............................................. G06F 15/020
[52] U.S. Cl. .................... 364/558; 73/379.01; 364/550
[58] Field of Search .............. 73/379.01; 364/550, 364/558, 410, 413.02, 413.03, 413.04; 434/255, 256

[56] References Cited

U.S. PATENT DOCUMENTS

| | | | |
|---|---|---|---|
| 3,411,222 | 11/1968 | Williams | 434/255 |
| 3,492,582 | 1/1970 | Heywood | 325/66 |
| 3,543,724 | 12/1970 | Kirkpatrick | 119/29 |
| 3,664,919 | 2/1972 | Mathauser | 340/279 |
| 3,897,058 | 7/1975 | Koch | 273/26 B |
| 4,117,834 | 10/1978 | McPartland et al. | 128/2 S |
| 4,457,715 | 7/1984 | Knight et al. | 434/22 |
| 4,571,682 | 2/1986 | Silverman et al. | 364/413 |
| 4,592,730 | 6/1986 | Knight et al. | 434/22 |
| 4,665,928 | 5/1987 | Linial et al. | 128/782 |
| 4,681,118 | 7/1987 | Asai et al. | 128/643 |
| 4,736,312 | 4/1988 | Dassler et al. | 364/561 |
| 4,757,453 | 7/1988 | Nasiff | 364/415 |
| 4,763,287 | 8/1988 | Gerhaeuser et al. | 364/561 |
| 4,771,394 | 9/1988 | Cavanagh | 364/561 |
| 4,774,679 | 9/1988 | Carlin | 364/550 |
| 4,912,638 | 3/1990 | Pratt, Jr. | 364/413.02 |
| 4,956,628 | 9/1990 | Furlong | 340/323 R |
| 4,957,286 | 9/1990 | Persons, II et al. | 272/73 |
| 4,974,833 | 12/1990 | Hartman et al. | 272/76 |
| 5,275,045 | 1/1994 | Johnston et al. | 73/379.01 |

OTHER PUBLICATIONS

Brochure: "Introducing F-Scan, the most advanced in-shoe foot force and gait system" 1991.
Production Description: Industrial Sensing System, Tekscan, Inc. 1991.
Corporate Capabilities, Tekscan, Inc. pp. 1.3–3.11, 1991.

Primary Examiner—Edward R. Cosimano
Attorney, Agent, or Firm—Burns, Doane, Swecker & Mathis

[57] ABSTRACT

A method and apparatus for equestrian monitoring for instruction and training comprises a plurality of force sensing devices which quantify the force interaction between a rider and a horse at selected contact points between the rider and the animal. The data is sent via a transmitting unit to an instructor's monitoring device. By viewing the monitor, the instructor can quickly and accurately quantify the interactions as they occur during various skill exercises and provide appropriate and prompt feedback and instructions to the rider.

19 Claims, 3 Drawing Sheets

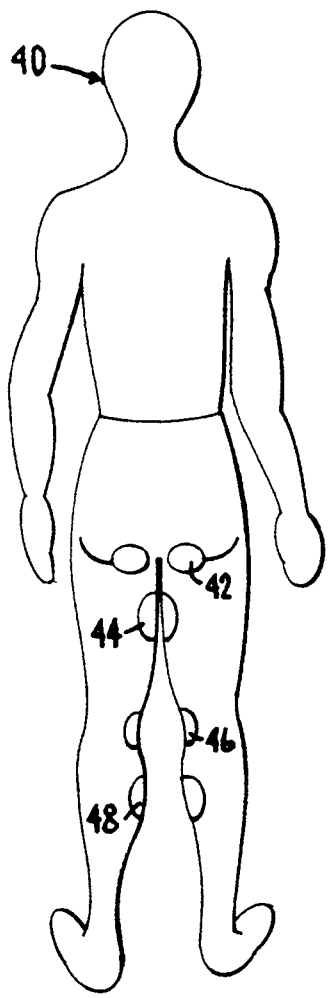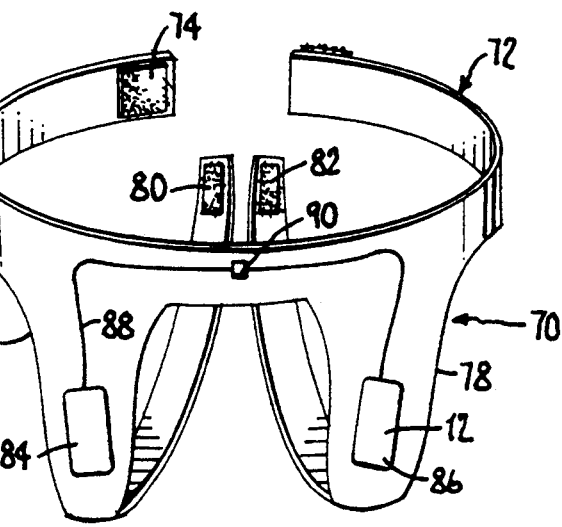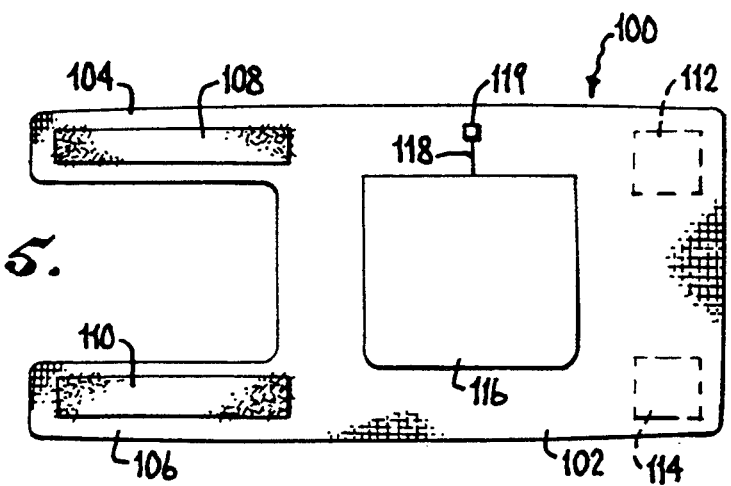
Fig. 3.
Fig. 4.
Fig. 5.

METHOD AND APPARATUS FOR EQUESTRIAN MONITORING FOR INSTRUCTION AND TRAINING

BACKGROUND OF THE INVENTION

1. Field of the Invention

The present invention relates to a method and apparatus for monitoring the interaction between a rider and a horse, and more particularly, a method and apparatus for determining forces exerted by the rider on the animal and simultaneously and remotely monitoring the forces for use in instruction and training.

2. State of the Art

Various methods and systems exist for measuring and monitoring sports and other physical activities. For example, U.S. Pat. No. 4,774,679 to Carlin discloses a system for sensing and displaying the occurrence and magnitude of ground reaction, or shock, forces produced by a participant in a sporting event. The system includes sensors which sense the vibration in the participant's leg, the vibration being proportional to the ground reaction force. The data from the sensors is collected and processed by a computer which produces a register tape printout showing graphically stride contact for each leg at a point in time and a numerical indication of the associated ground reaction force.

Another example is U.S. Pat. No. 4,956,628 to Furlong, which discloses a device for monitoring contact between an athlete's shoes and the ground for use in judging race walking, a sport which requires that at least one foot be in contact with the ground at all times. The soles of the shoes are equipped with sensors which sense whether the shoe is in contact with the ground. Signals from the shoes are combined and transmitted to a remote monitoring device which produces an alarm if contact is not sensed in at least one shoe.

Equestrian sports, which include horseback riding, dressage, show jumping, and thoroughbred racing, among others, are unique among athletic events in that the equestrian sports require that a human and animal perform as a single unit. The rider, sitting on the horse, must control the animal by communicating commands to it, and must continually respond to the performance of the animal with new commands. The rider's commands are given both verbally and, more importantly, through physical contact between the rider and the horse, that is, by whip, by reins, by pressure from the rider's legs, and by shifts in weight in the saddle. The physical commands range from forceful to subtle shifts, pulls and pushes.

The intimate and continuous interactive relationship between the rider and horse gives rise to difficulties in examining, testing and understanding the various, and frequently complex, skills necessary to achieve proficiency in horseback riding. The problems arise, at least in part, from the lack of an integrated system to measure and quantify directly the interplay between the rider and the horse, and allow an instructor to simultaneously receive the measured data.

The conventional methods of teaching riding suffer from various disadvantages. One disadvantage is that the riding instructor cannot directly quantify the interaction between the rider and the horse, that is, the force or pressure applied by the rider on the reins and by his legs. Typically, an instructor standing beside the ring or track observes the rider's body position and the performance of the horse, attempts to interpret those observations in terms of movement or performance of both the animal and rider, and, based on the visual observations and interpretations, provides instructions to the rider.

The information received by the instructor is incomplete in that it is derivative of the actual interaction between the rider and horse. That is, the instructor generally sees only the result of the rider's interaction with the horse and not, for instance, the actual application of pressure by the rider's knee. Furthermore, the instructor's view at any instant in time is partial because of obstructions, for example, the instructor can generally only observe one side of the horse at a time. Because the movements and interaction between the rider and animal are complex and often subtle, the instructor may misinterpret the horse's performance and provide the rider with incorrect instructions. In formulating instructions, the instructor has no way to quantify the instructions, for example, how hard to pull or push, or to monitor whether the rider is implementing the instructions correctly. As a result, the instructor must rely on a trial-and-error methodology of continually providing instruction and observing the outcome, a method which is not only time consuming and inaccurate, but may slow the learning process and be frustrating for the student rider.

SUMMARY OF THE INVENTION

The present invention overcomes the problems in conventional teaching methods by providing a method and apparatus for monitoring and quantifying the interaction between a horse and rider for presenting the quantified information for use by an instructor and rider.

More particularly, the present invention provides an apparatus comprising a plurality of sensors placed between the rider and the horse responsive to forces exerted by the rider on the horse for producing a signal proportional to the magnitude of the force. The apparatus further comprises a unit for processing the signal and transmitting the signal to a remote monitoring device. The remote monitoring device receives the signal and provides a display of the signal from each sensor in a form comprehensible to the instructor.

The apparatus includes a monitoring device for providing a graphic display for data from each of the sensors from which information can be visually obtained quickly and accurately.

The present invention also provides a method for monitoring the interaction between a rider and an animal wherein sensors are placed on the rider's legs on the medial calf at about the gastrocnemius, on the knee at about the medial condyles of the femur and tibia, and on the medial upper thigh at about the medial adductor longus for determining the magnitude of the forces exerted by the rider on the animal at these locations. Sensors are also provided for determining the magnitude of forces exerted between the saddle and the rider's seat bones around the area of the ischial tuberosities. The apparatus also includes sensors interposed in the reins for determining tension in the reins, and may also include sensors built into the stirrup irons for determining the force applied by the rider's feet in the stirrups.

The present invention provides an apparatus wherein sensors used on the rider's legs generally comprise relatively large, flat pressure-sensitive pads responsive both to pressure exerted by soft tissue, i.e., muscles in the rider's legs, and by the bony prominences of the knee and seat. The apparatus could also include strain gage type transducers in the reins and stirrups to measure applied tension in the reins and stirrups.

According to the method of the present invention, an instructor continuously monitors data produced by the sensors to obtain information and therefore an understanding of rider/animal interaction, which allows the instructor to provide accurate and prompt instruction to the rider.

BRIEF DESCRIPTION OF THE DRAWINGS

The present invention can be further understood with reference to the following description in conjunction with the appended drawings, wherein like elements are provided with the same reference numerals, and wherein:

FIG. 3 is a posterior silhouette view of a rider indicating locations of sensors on the rider's body;

FIG. 4 is a perspective view of a girdle for containing sensors and positioning them at a rider's seat bones;

FIG. 5 is a front view of a sensor retainer for use on a rider's legs;

DETAILED DESCRIPTION OF THE PREFERRED EMBODIMENTS

Figure 1:
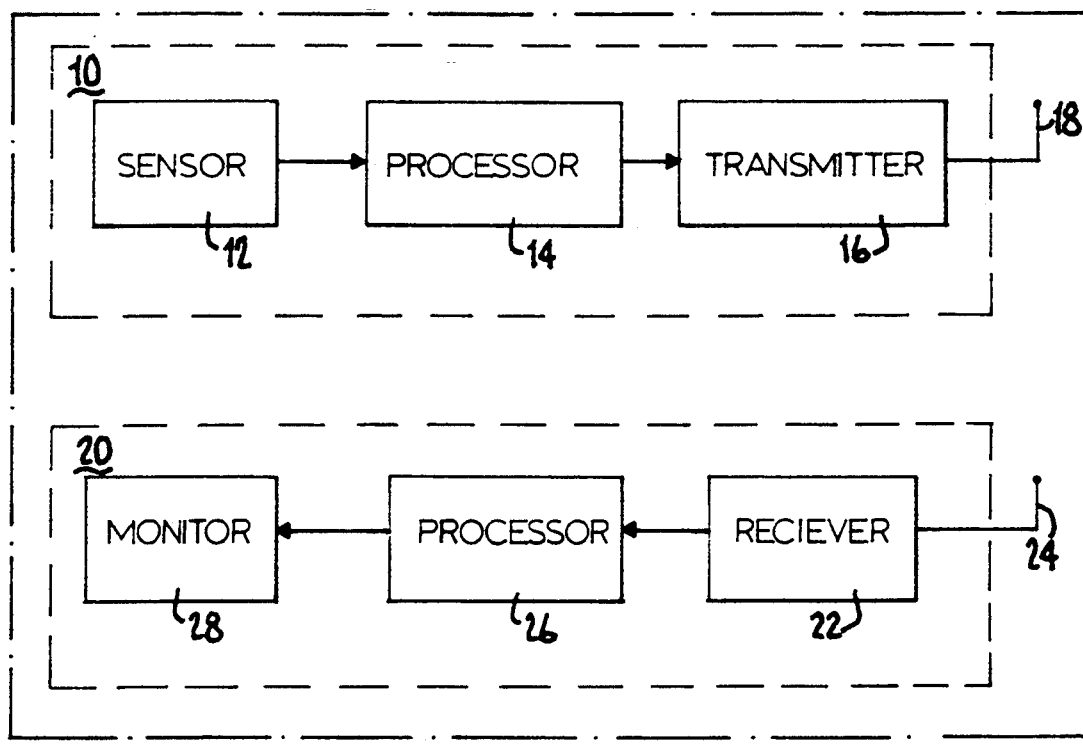
FIG. 1 is a schematic diagram of a monitoring apparatus of the present invention.

FIG. 1 is a schematic of an equestrian monitoring apparatus of the present invention. The apparatus is comprised, generally, of two functional elements, a sensing unit 10 and a monitoring unit 20. The sensing unit 10 is comprised of at least one sensor 12 for producing a signal in response to the magnitude of the force being exerted at a preselected point between the rider and the horse. Although only one sensor 12 is shown in FIG. 1 for simplicity, it is understood that a plurality of sensors will typically be connected to the signal processing unit 14. Preferably, each sensor 12 is integrated electrically to a signal processing unit 14 for processing the signal for use by a transmitter 16. The transmitter 16 transmits the signals from the sensors via an antenna 18 to the monitoring unit 20.

The sensor 12 is selected for application at each of the preselected points. The sensors 12 are responsive to a force being applied to them, and produce a signal proportional to the magnitude of the force being applied. As is described more fully below, the sensors 12 are placed at points between the rider's body and the horse to monitor both the rider's body position and use of his body in controlling the horse. In addition, sensors 12 may also be placed in the stirrups and reins to monitor the rider's use of those components. In a preferred embodiment of the invention, the signal processing unit 14 and the transmitter 16 are contained in a single unit and carried or worn by the rider on a belt, as described below.

Preferably, sensors 12 used between the rider's body and the horse are of the type that are typically flat, pad-like elements that produce a signal proportional to the overall compressive force being exerted on the pad.

The sensor 12 is selected to respond to a range of compressive forces which may typically be expected in riding, generally two to three times a rider's body weight, and to respond to forces exerted both by soft tissue, such as muscle, and hard tissue, such as bone. The preferred transducer of this type comprises flat pad elements having conductors on each surface and spaced, opposed conductive grids connected to the conductors which are forced into contact under pressure and provide a varying resistance through the pad in response to pressure. The thin, flexible pressure sensor produced by Tekscan, Inc. of Boston, Mass., is an example of such a sensor. Alternatively, the sensor 12 may comprise a pressure-sensitive foam elastomer formed in a pad shape having conductors on each surface and embedded with conductive particles which similarly responds to pressure by varying the resistance of the pad.

Other differently configured sensors 12 are interposed in the reins and in the stirrups, as more fully described below. In these applications, tension, rather than compression, is generally applied by the rider and a strain gage type transducer is used for determining the force exerted.

The monitoring unit 20 is comprised of an antenna 24 and a receiver 22 for receiving the signal transmitted by the sensing unit 10. A signal processing unit 26 is connected for receiving the signal from the receiver 22 and processing the signal for subsequent display on a monitor display 28. The processed signal can, for example, be an analog signal having a voltage proportional to the amount of force detected by a corresponding sensor which is displayed on the monitor display 28. Alternatively, the signal processing unit can output digitized information. The monitor display 28 for displaying the processed signal in a form which is comprehensible to an instructor is connected to receive the signal from the processing unit 26.

Figure 2:
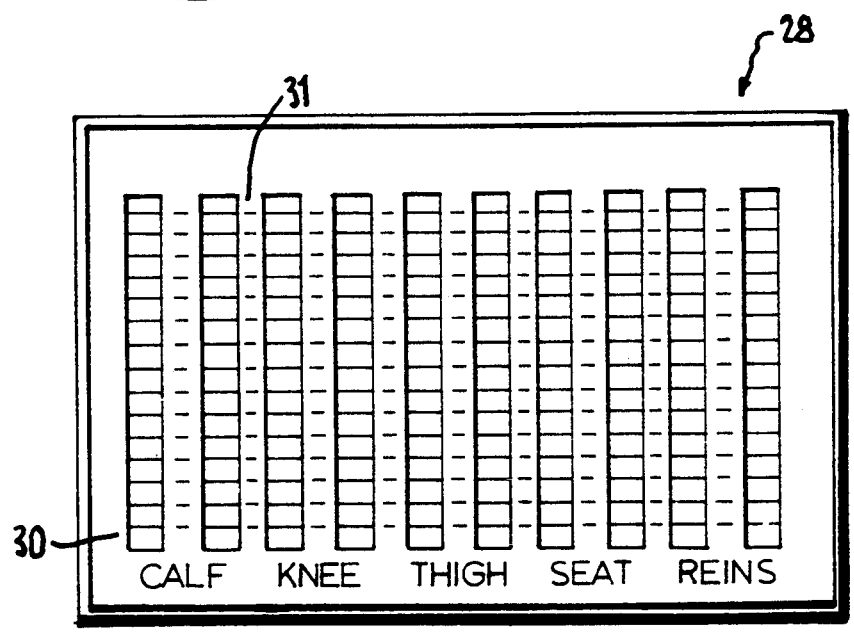
FIG. 2 is a front view of a display for a monitor unit of the present invention.

FIG. 2 shows a front view of a monitor display 28 of the present invention. The monitor display 28 receives a signal from the receiver signal processing unit 26 and displays the information in a form comprehensible to the instructor or rider. The monitor display 28 is designed to enable the instructor to obtain information quickly and accurately by visually scanning the display. In a preferred embodiment of the invention, the monitor display 28 produces an analog graphic representation of the information sensed by the sensing unit 10. An analog display is more readily comprehensible upon viewing and is preferred because the parameters, the magnitudes of the forces, change quickly and frequently. The monitor display 28 comprises rows 30 of lights, each row corresponding to the signal from one of the transducers 12. As shown illustratively in FIG. 2, the monitor display 28 includes designations for rows 30 corresponding to "calf," "knee," "thigh," "seat," and "reins." It is understood that the monitor display 28 may also include rows 30 designated for the stirrups, and perhaps, a whip. The individual lights in the rows 30 are lighted in response to the signal provided by the signal processing unit 26 in the manner of a bar graph. Preferably the lights are of the LED type. Scales 31 are provided on the display to indicate the magnitude of the force which corresponds to the number of LEDs lighted in each row 30. Although the scales 31 are illustrated in FIG. 2 as comprising lines as indicating the value for the magnitude of forces, it is understood that numerals indicating magnitude of forces corresponding to the lines shown may also be provided.

As can be seen in FIG. 2, the rows are arranged in groups corresponding to the locations selected for the sensors 12, and are identified as "right" and "left" signals. This provides the instructor with an easily intelligible visual indication of the magnitude of the force at the selected points and allows the instructor to compare the relative level of the force between points.

FIG. 3 is a posterior silhouette view of a rider 40 showing the preferred areas on the rider's body for monitoring the interaction with the horse. For the sake of clarity, only the right side areas are given reference numerals; however, the numerals should be understood to indicate the corresponding left side body areas as well. In a preferred embodiment, these areas correspond to the ischial tuberosities (seat bones) 42, the proximal medial adductor longus bulge (upper thigh) 44, the medial condyles of the tibia and femur (inner knee) 46, and the proximal medial gastrocnemius (bulge of the calf) 48.

These areas have been found to be of particular importance in correct riding position and control of the animal. Evaluation of the pressure on the seat bone 42 and upper thigh 44 areas can indicate whether the rider is sitting correctly in the saddle, with the pelvis and legs correctly oriented. In addition, weight shifts in the saddle, which involve pressure shifts between the seat bones, are also useful in controlling the horse. Evaluation of the pressure exerted by the upper thigh 44, inner knee 46 and inner calf bulge 48 can indicate both correct riding posture and the pressure being applied by the rider with his or her legs to control the horse.

Because riding is a dynamic sport and the comfort of the rider is important in riding technique, particular attention is directed to the means for positioning the sensor on the rider's body to achieve both comfort and stable placement. FIG. 4 is a perspective view of a girdle 70 which is worn by the rider for positioning the sensors 12 adjacent to the seat bones 42. The girdle 70 comprises a belt 72 having a fastener 74 at the belt ends. The fastener 74 is preferably a hook and loop device for easy use. At the rear of the belt 72 are two vertical extensions 76, 78 that pass under the legs and to the front where they attach to the belt. At the end of the extensions are fasteners 80, 82, preferably hook and loop type fasteners, to facilitate attaching the extensions to the belt 72. Pockets 84, 86 in the extensions 76, 78 hold sensors 12 and are arranged on the extensions to correspond with the location of the seat bones when worn by the rider. Lead wires 88 are embedded in the extensions 76, 78 and connect the sensors 12 with a junction 90 on the belt 72. The junction 90 connects the lead wires 88 to the signal processing unit (not pictured in this figure) by any suitable means.

FIG. 5 is a front view of a sensor retainer 100 for positioning sensors 12 at sensing locations on the rider's legs, which positions were described above in connection with FIG. 3. In a preferred embodiment, the sensor retainer 100 comprises a band 102 of elasticized material having two elongated straps 104, 106 extending from one end. The retainer 100 is wrapped around the rider's leg at the appropriate location and is secured by the straps 104, 106. Hook and loop fastener elements 108, 110 on the straps 104, 106 engage the complementary elements 112, 114 on the opposite side of the band 102. A pocket 116 in the band 102 holds a sensor of the flat pad type, as described above. A lead wire 118 connects the sensor to a junction 119, which is connected to the signal processing unit (not shown). Preferably, a sensor retainer 100 would be worn to position and secure a sensor on the rider's legs at each of the calf 46, knee 44, and thigh 42 positions.

Figure 6:
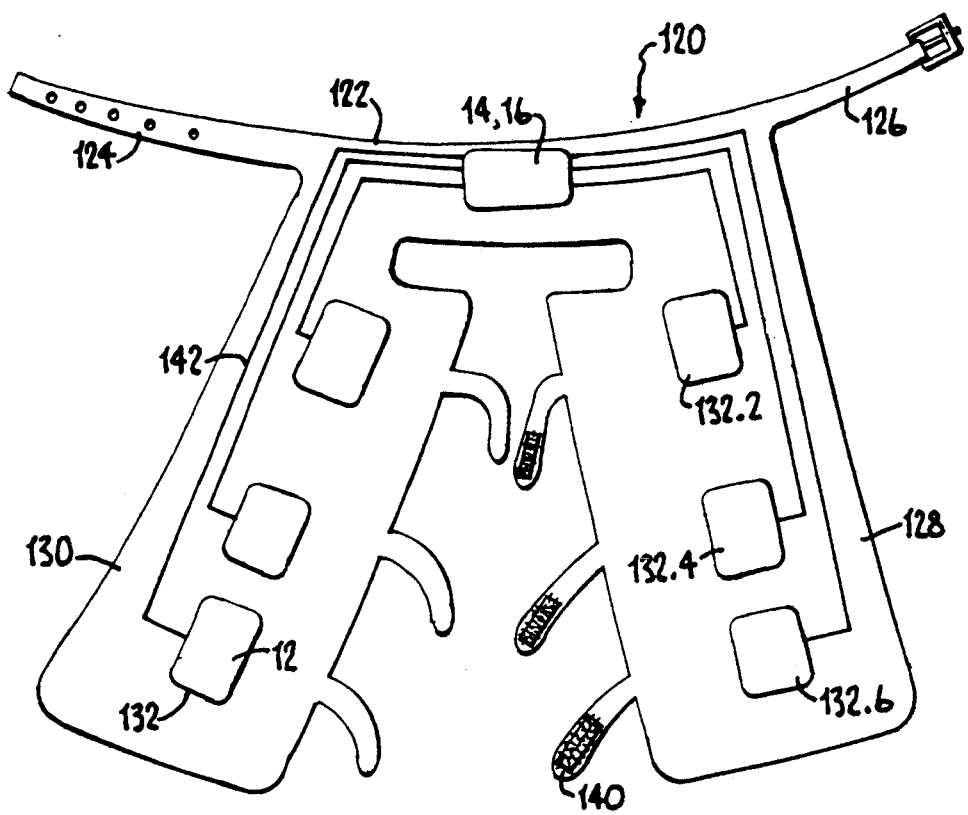
FIG. 6 is a front view of an alternative embodiment of a chaps-style sensor retainer for a rider's legs.

FIG. 6 is a front view of an alternative chaps-style sensor retainer 120. This sensor retainer 120 is designed to be worn as a pair of chaps about the rider's legs and is an alternative to the sensor retainer of FIG. 5 allowing all the leg sensors to be contained in a single garment. The chaps-style sensor retainer 120 includes a waist band 122 having a belt 124 and buckle 126 which wrap around the rider's waist or lower back. Leggings 128, 130 extend downwardly from the waist band 122 and wrap around the medial side of the rider's legs. Provided in the leggings 128, 130 are pockets 132 for retaining flat pad type sensors 12 such as those previously described. The pocket locations are determined so as to hold the sensors 12 at the locations corresponding to the upper thigh 132.2, the knee 132.4, and the proximal calf 132.6. The locations upper thigh 132.2, knee 132.4, and calf 132.6 correspond, respectively, to the locations identified as 44, 46 and 48 in FIG. 3. The leggings 128, 130 are secured to the legs by the straps 140, which wrap around the leg and are fastened by conventional means such as hook and loop fasteners.

Lead wires 142 connect the sensors 12 to the signal processing unit 14 and transmitter 16 which are preferably contained in a single unit which can be secured to the waist band 122.

Figures 7, 8:
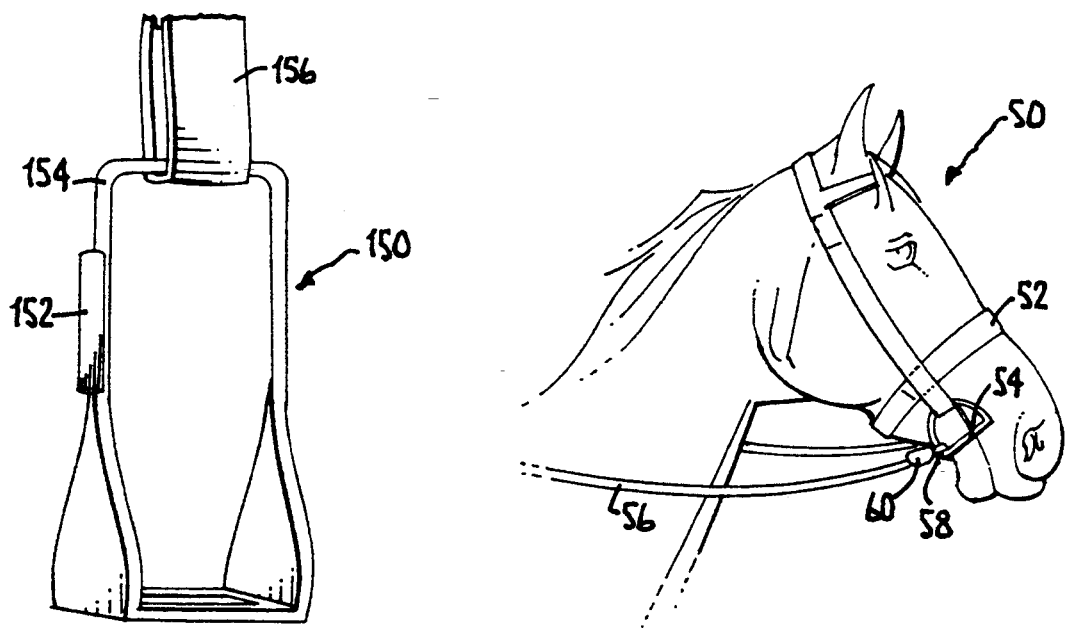
FIG. 7 is a perspective view of a stirrup equipped with a strain gage.
FIG. 8 is a perspective view of a horse's head showing a bit with a strain gage.

FIG. 7 shows a perspective view of a stirrup iron 150. A strain gage 152 for measuring the tension applied to the iron 150 by the rider's foot and leg (not shown) is shown installed on the side of the stirrup iron 150. A lead wire 154 runs from the strain gage 152 up through the stirrup strap 156 to a junction (not shown) for connection with the signal processing unit 14 and transmitter 16 (not shown). Alternatively, the strain gage may be located in the lower part 158 of the stirrup iron 150.

FIG. 8 is a perspective view of a horse head 50 showing a bridle 52 and a bit 54. The reins 56 extend from the bit ring 58 back to the rider. Interposed on the reins 56 is a strain gage 60 to measure the tension in the reins applied by the rider. A wire (not shown) is embedded in the reins 56 and carries the signal from the strain gage 56 to the signal processing unit 14 (not shown in this figure) which is carried on the rider's waist.

The particular components of the present invention have been described in terms of characteristics and function and are not intended to be limited to specific models or manufacturers. The present invention regards the novel combination and application of the components herein described in performing the method and constituting the apparatus which makes up the invention.

The foregoing has described the preferred principles, embodiments and modes of operation of the present invention; however, the invention should not be construed as limited to the particular embodiments discussed. Instead, the above-described embodiments should be regarded as illustrative rather than restrictive, and it should be appreciated that variations, changes and equivalents may be made by others without departing from the scope of the present invention as defined by the following claims.

What is claimed:

1. A method for monitoring the interaction characteristics between an animal and a rider positioned on the animal, comprising the steps of:
   sensing a force exerted by a selected body portion of a rider on an animal by sensing means secured to the selected body portion;
   producing a signal proportional to the magnitude of the force;
   displaying a representation of the signal in a comprehensible form.

2. The method of claim 1, further comprising the step of transmitting the signal to a remote monitoring device before displaying the signal.

3. The method of claim 1, wherein the step of sensing a force exerted by a rider on an animal is performed continuously and wherein the representation of the signal is displayed in an analog graphic form.

4. The method of claim 1, wherein the step of sensing a force exerted by a rider on an animal includes sensing forces exerted by a rider at locations corresponding to a rider's upper medial thigh area, a rider's medial condyles of the tibia and femur, and a rider's medial gastrocnemius area.

5. The method of claim 1, wherein the step of sensing a force exerted by a rider on an animal includes sensing a force exerted by a rider in a rein and on a stirrup iron mounted on an animal.

6. The method of claim 1, further comprising the step of utilizing the displayed representation of the signal to provide instruction to a rider.

7. An apparatus for determining the interaction characteristics between an animal and a rider positioned on the animal, comprising:
   a plurality of sensors responsive to forces exerted by at least one selected body portion of a rider on an animal for producing a signal proportional to the magnitude of the force exerted;
   sensor retainer means for securing the sensors to contact points on the rider;
   transmitter means for transmitting the signals produced by the sensor means to a remote receiving means;
   receiving means for receiving the signals from the transmitter; and
   monitor means integrated with the receiving means for reproducing and displaying the signals received by the receiving means in a comprehensible form indicating the magnitude of the force exerted by the rider on the animal.

8. The apparatus as claimed in claim 7, wherein the sensor means comprises a plurality of flat, pad elements responsive to pressure for producing an electrical signal proportional to the magnitude of the force exerted on the pad.

9. The apparatus as claimed in claim 7, wherein the sensor means includes at least two sensors which are adapted to be located at a rider's left and right leg gastrocnemius bulge, at least two sensors adapted to be located at a rider's medial condyles of the left and right femur and tibia, at least two sensors adapted to be located at a rider's left and right upper thigh at the medial-proximal area and at least two sensors adapted to be located at a rider's seat bones.

10. The apparatus as claimed in claim 7, further comprising a signal processing unit associated with the sensor means for processing the signal produced by the sensor means for transmission by the transmitter means.

11. The apparatus as claimed in claim 7, further comprising a signal processing unit associated with the receiving means for processing the signal received by the receiving means for display on the monitor means.

12. The apparatus as claimed in claim 7, wherein the monitor means displays the signals in an analog graphic format.

13. The apparatus as claimed in claim 7, wherein the sensor retainer means comprises an elastic strap which wraps around a limb, the strap including pockets for holding the sensors and a fastener means for fastening opposite ends of the strap to one another to secure the strap in place on a limb.

14. The apparatus as claimed in claim 7, wherein the sensor retainer means comprises a waist band adapted to be wrapped around a rider's waist, two leggings extending from the waist band and adapted to be individually wrapped around a side of a rider's legs, pockets provided in the leggings for holding the plurality of sensors at preselected contact points, means for fastening the waist band around a rider's waist and means for fastening the leggings around a rider's legs.

15. The apparatus as claimed in claim 7, further comprising sensor means adapted to be placed in a bit of an animal for determining tension applied to a rein.

16. The apparatus as claimed in claim 15, wherein the sensor means comprises a strain gage type sensor.

17. The apparatus as claimed in claim 7, further comprising sensor means adapted to be placed in a stirrup iron to determine tension in a stirrup strap.

18. The apparatus as claimed in claim 17, wherein the sensor means comprises a strain gage type sensor.

19. An apparatus for determining the interaction characteristics between an animal and a rider seated on the animal, comprising:
   a plurality of pressure sensitive sensors responsive to forces exerted by the rider at selected contact points between the rider and the animal for producing a signal proportional to the magnitude of the force exerted by the rider on the animal;
   a retainer for holding a sensor at a selected location on the rider's body;
   at least one strain gage adapted to be interposed in a bit on the animal, the strain gage being responsive to the tension applied to the bit through a rein;
   at least one strain gage adapted to be interposed in a stirrup iron on an animal and responsive to tension applied to the iron through a stirrup strap;
   a signal collector to collect the signals from the sensors;
   a signal processing means to convert the signals collected from the sensors into a transmittable signal;
   a transmitter for transmitting the signals produced by the signal processing means;
   a receiver for receiving the signals at a location remote from the transmitter;
   a monitor integrated with the receiver for displaying the signals received by the receiver in comprehensible form indicating the magnitude of the forces exerted by the rider on the animal.

* * * * *